Nov. 5, 1935.  J. Z. HERR  2,019,535
COMBINATION JUICE EXTRACTOR AND BEVERAGE SHAKER
Filed June 16, 1934
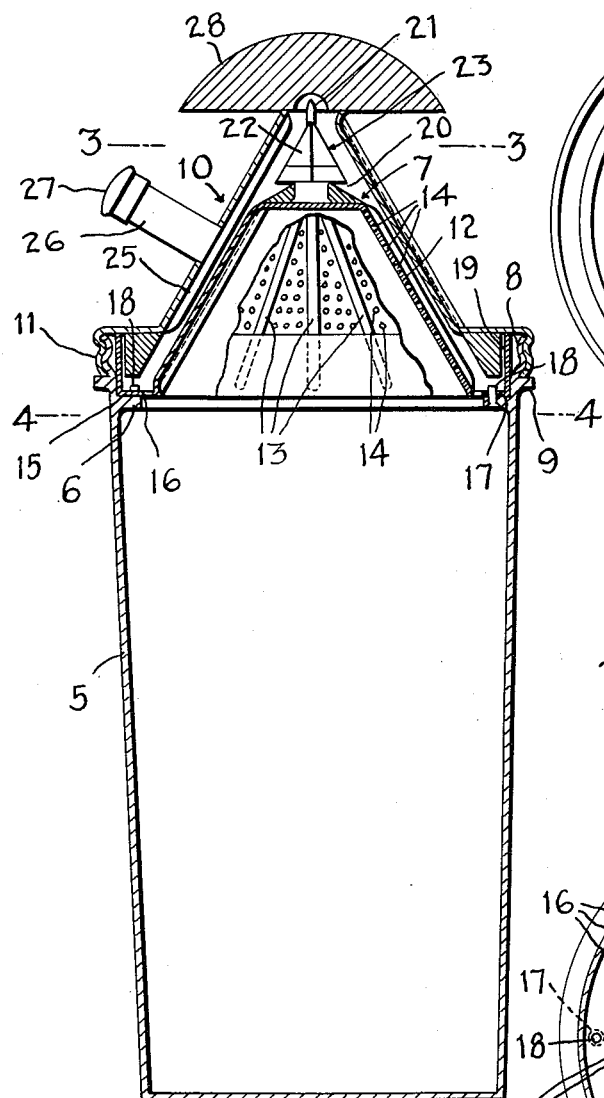
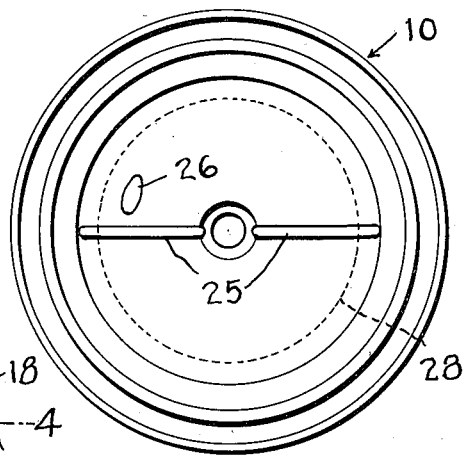
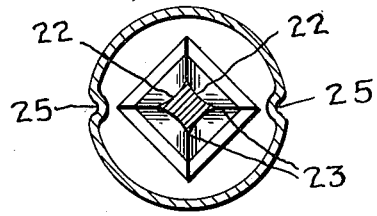
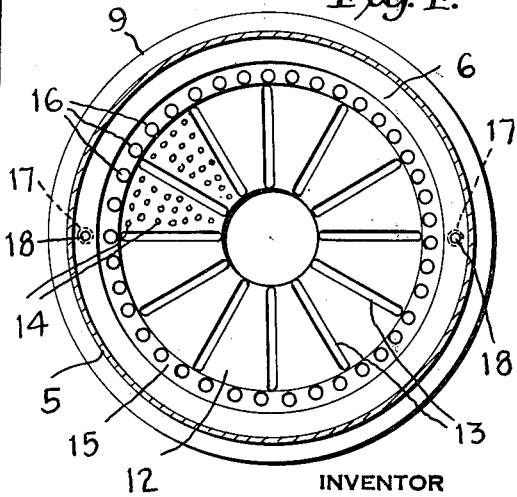
INVENTOR
John Z. Herr
BY
HIS ATTORNEY Patented Nov. 5, 1935

2,019,535

UNITED STATES PATENT OFFICE 2,019,535

COMBINATION JUICE-EXTRACTOR AND BEVERAGE SHAKER

John Z. Herr, New York, N. Y.

Application June 16, 1934, Serial No. 730,857

2 Claims. (Cl. 146—3)

This invention relates to combined beverage shakers and fruit squeezers, designed especially for the purpose of extracting the juice of lemons and other citrus fruits, so that the juice, when extracted, will fall directly into the shaker.

The object of the improvements in this invention are (1) to have the squeezer element in a ready position for operation, (2) to apply the whole fruit to the squeezer element in extracting the juice, instead of cutting in halves, and (3) to eliminate the contact of the hands with the actual fruit during the extracting process, thereby performing a more sanitary operation.

Features and advantages of this invention and other objects to be accomplished will be fully apparent by a perusal of the following specification, and study of the accompanying drawing forming a part thereof.

Referring to said drawing:

Fig. 1 is a longitudinal sectional view, part of the juice-extractor being in elevation;

Fig. 2 is a bottom plan view of the dome or closure element;

Fig. 3 is a cross sectional view on a larger scale taken on the line 3—3 of Fig. 1; and Fig. 4 is a cross sectional view taken on line 4—4 of Fig. 1.

Referring again to said drawing the reference numeral 5 designates the container portion of the shaker. The inner wall of the container is provided with an annular flange 6 which forms a seat for the squeezer element 7. The open end of the container 5 is threaded at 8 and is provided with a ledge or flange 9 which acts as a seat for the dome or closure member 10. The closure member 10 has threads 11 which engage the threaded portion 8 of the container.

The squeezer element 7 comprises a truncated conical portion 12 provided with a plurality of ribs 13 and perforations 14 through which the fruit juice may pass. The lower part of the squeezer element is formed into an annular trough or bowl. The bottom wall 15 of this trough rests on the flange or seat 6 and is provided with a series of openings or slots 16 through which the expressed juice may pass as well as through the perforations 14 in the conical part. This bottom wall is further provided with a pair of openings 17 which are engaged by pins 18 on the seat 6 thus preventing the squeezer element from rotating while the juice is being extracted.

The annular flange 19 forms the outer wall of the trough or bowl and when the squeezer element is in position the top of this flange is substantially flush with the top of the container and fits the inside of the container in a fairly snug manner. The dome or closure element engages the top of the flange 19 and thus vibration of the squeezer element is prevented when the shaker is being used.

The upper part of the squeezer element is flattened and has mounted thereon a member having two functions, one function being to facilitate handling the squeezer element when removing it or positioning it and the other function being to aid in positioning the fruit of which the juice is to be extracted. This member is pyramid-shaped and has an undercut 20 which serves as a convenient hold for the thumb and forefinger when removing the squeezer element from the container or when positioning it.

The apex or point 21 of the pyramid-shaped part is rounded so as to form a point sufficiently sharp to pierce the skin of the fruit. The surfaces 22 of the pyramid are concave so as to form cutting edges 23 as particularly illustrated in Fig. 3. This construction permits of applying a whole fruit and easily pressing it as far as the undercut portion where it will conveniently rest ready for the expressing operation. As heretofore stated the point 21 pierces the skin of the fruit after which the edges 23 break the skin in desirable places so that the fruit will distribute itself more conveniently and to a better advantage around the cone. Obviously a half fruit may be applied in the same manner if desired.

The closure element or dome 10 is provided with two or more ribs 25 which engage the skin of the fruit and prevent the fruit from rotating in the interior of the dome or closure element. The balance of the interior of the closure element is smooth allowing the fruit to slide freely toward the top of the dome during the expressing operation. The closure element is provided with a pouring spout 26 and a removable cap or stopper 27.

Secured to the upper part of the closure element is a bell-shaped member 28 which fits the palm of the hand.

In the operation the whole fruit is positioned on the squeezer element as heretofore described. The thumb and forefinger are placed on the pouring spout 26 and the palm of the hand encloses the top 28 of the closure member. The closure member is then given a downward pressure and gently twisted back and forth. The juice is extracted, passing into the container through the perforations 14 and openings 16, and the seeds and coarse matter are deposited in the annular trough surrounding the squeezer element.

By this method uniform pressure is exerted on all parts of the fruit and consequently the pulp cells of the fruit are more efficiently broken.

After the juice has been extracted the squeezer element is lifted from its position and cleaned, after which it is properly placed and reseated in the container. In pouring the liquid from the container through the spout the squeezer element acts as a strainer.

While a preferred embodiment of the invention has been illustrated and described changes in details of construction and arrangement of parts may be made by one skilled in the art and all such changes are to be considered as coming within the spirit of the invention as defined in the appended claims.

I claim

1. A combination beverage shaker and juice-extractor having in combination a container, a squeezer element located in an operative position in the mouth of said container, a pyramid shaped, pointed member secured to the top of said squeezer element to pierce and hold in position a whole or half fruit by pressing the fruit by hand over the pyramid shaped member, an undercut portion below said pyramid shaped top to aid in positioning and removing of the squeezer element from the container in a convenient manner with the thumb and forefinger, and a closure member for said container, the interior of said closure member substantially conforming to the shape of and fitted snugly over the squeezer element when the container is closed, so that in extracting juices, said closure member in cooperative action with said squeezer element will press the fruit against the squeezer element and express the juices into said container.

2. A combination beverage shaker and juice extractor, having in combination a container, a perforated squeezer element located in an operative position in the mouth of said container, a closure member for said container, the interior of said closure member substantially conforming to the shape of and fitting snugly over the squeezer element when the container is closed, a spout for said closure member, and a bell-shaped top for said closure member, said spout being conveniently located in relation to the said bell-shaped top, thus permitting the closure member, in addition to its function as a closure, to press the fruit against the squeezer element by grasping the spout with the thumb and forefinger, the bell-shaped top resting in the palm of the hand, and gently pressing down and twisting back and forth to express and strain the juices through the perforations in the squeezer element into the container, and the squeezer element acting as a strainer when the contents of the container are being poured.

JOHN Z. HERR.